(12) United States Patent
Chuberre et al.

(10) Patent No.: US 9,363,712 B2
(45) Date of Patent: Jun. 7, 2016

(54) SATELLITE COMMUNICATION SYSTEM FOR A CONTINUOUS HIGH-BITRATE ACCESS SERVICE OVER A COVERAGE AREA INCLUDING AT LEAST ONE POLAR REGION

(71) Applicant: THALES, Neuilly-sur-Seine (FR)

(72) Inventors: Nicolas Chuberre, Pibrac (FR); Judith Cote, Toulouse (FR); Jean-Jacques Bruniera, Lacroix-Falgarde (FR); Patrick Benard, Plascassier (FR); Dominique Potuaud, La Salvetat Saint Gilles (FR)

(73) Assignee: Thales, Courbevoie (FR)

( * ) Notice: Subject to any disclaimer, the term of this patent is extended or adjusted under 35 U.S.C. 154(b) by 262 days.

(21) Appl. No.: 14/453,303

(22) Filed: Aug. 6, 2014

(65) Prior Publication Data

US 2015/0358861 A1 Dec. 10, 2015

(30) Foreign Application Priority Data

Dec. 23, 2013 (FR) ..................................... 13 03063

(51) Int. Cl.
| | |
|---|---|
| *H04B 7/185* | (2006.01) |
| *H04W 36/00* | (2009.01) |
| *H04B 7/19* | (2006.01) |
| *H04B 7/195* | (2006.01) |
| *H04W 84/06* | (2009.01) |
| *H04W 88/14* | (2009.01) |

(52) U.S. Cl.
CPC ....... *H04W 36/0011* (2013.01); *H04B 7/18513* (2013.01); *H04B 7/18515* (2013.01); *H04B 7/18517* (2013.01); *H04B 7/18578* (2013.01); *H04B 7/18584* (2013.01); *H04B 7/19* (2013.01); *H04B 7/195* (2013.01); *H04W 84/06* (2013.01); *H04W 88/14* (2013.01)

(58) Field of Classification Search
USPC ............................. 455/427–432.1, 436, 12.1
See application file for complete search history.

(56) References Cited

U.S. PATENT DOCUMENTS

| | | |
|---|---|---|
| 5,410,728 A | 4/1995 | Bertiger et al. |
| 5,604,920 A | 2/1997 | Bertiger et al. |
| 5,666,648 A | 9/1997 | Stuart |
| 6,597,989 B2 | 7/2003 | Castiel |

(Continued)

FOREIGN PATENT DOCUMENTS

| | | |
|---|---|---|
| WO | 99/56408 A1 | 11/1999 |
| WO | 00/41340 A1 | 7/2000 |
| WO | 2012/040828 A1 | 4/2012 |

*Primary Examiner* — Fayyaz Alam
(74) *Attorney, Agent, or Firm* — Baker & Hostetler LLP

(57) ABSTRACT

A system comprises a constellation of satellites placed in non-geostationary orbit, user terminals located in a coverage area, and N anchor stations able to ensure bidirectional communications with the user terminals by way of at least one satellite. The system furthermore comprises a network of routers interconnected with one another and to the Worldwide Internet Network, each anchor station is connected to the Worldwide Internet Network by way of a router, and each anchor station comprises a management device for managing the handovers to ensure service continuity for the communications. This management device is able to control the handovers between the successive orbiting satellites progressing over the coverage area, the handovers between anchor stations, or the handovers between simultaneously successive satellites and anchor stations.

11 Claims, 12 Drawing Sheets

(56) References Cited

U.S. PATENT DOCUMENTS

| | | | | |
|---|---|---|---|---|
| 6,866,231 B2 * | 3/2005 | Higgins | ............... | B64G 1/1007 244/158.4 |
| 2003/0114102 A1 | 6/2003 | Golding | | |
| 2012/0069943 A1 | 3/2012 | Lim et al. | | |
| 2014/0017992 A1 * | 1/2014 | Bigras | ............... | H04B 7/195 455/12.1 |

* cited by examiner

SATELLITE COMMUNICATION SYSTEM FOR A CONTINUOUS HIGH-BITRATE ACCESS SERVICE OVER A COVERAGE AREA INCLUDING AT LEAST ONE POLAR REGION

CROSS-REFERENCE TO RELATED APPLICATION

This application claims priority to foreign French patent application No. FR 1303063, filed on Dec. 23, 2013, the disclosure of which is incorporated by reference in its entirety.

FIELD OF THE INVENTION

The present invention relates to a satellite communication system for a continuous high-bitrate access service over a coverage area including at least one polar region. It applies to broadband telecommunications, of high quality, in particular in the C, Ku, Ka band or beyond, for fixed or roaming terminals or those onboard terrestrial, aeronautical or maritime mobile platforms. It applies to any type of coverage area including at least one North or South polar region. A region delimited by a latitude of greater typically than 60° in the North hemisphere or respectively 60° in the South hemisphere is called a polar region.

BACKGROUND

Document U.S. Pat. No. 6,597,989 describes a satellite communication system optimized to ensure coverage over the elevated population areas of the North hemisphere. This system comprises a constellation of satellites in elliptical orbit with an apogee of less than 4000 km and is optimized to cover by priority the high population density geographical areas of the North hemisphere. This system is optimized to offer maximum capacity above 25° N of latitude and reduced capacity between 25° N and 50° S, which does not include the region of the South pole.

The document "Extension of mobile satellite communications to the polar regions" published in 1984 in the journal "Space communication and broadcasting 2" on pages 33 to 46, describes a constellation of satellites in low circular orbit inclined at 90°, the satellites being disposed at an altitude of between 1400 km and 1600 km, so as to ensure low-bitrate, intermittent mobile service in the L band over the polar areas delimited by the latitudes 70° North and 70° South. This system exhibits the drawback of not making it possible to ensure a high-bitrate service, nor of ensuring continuous service over the polar regions.

Documents U.S. Pat. No. 5,410,728 and U.S. Pat. No. 5,604,920 describe a constellation of 66 satellites distributed over 11 planes of an orbit inclined at 86.4° at the altitude of 781 km so as to ensure an L-band mobile service over a worldwide coverage including both poles. This system exhibits Ka-band feeder links to anchor stations. However, the capacity of the Ka-band resources is not sufficient over the poles to meet future requirements identified for 2020. In particular the high-bitrate-service capacity requirements are evaluated at 250 to 400 Mbps, at latitudes greater than 75° North and 4000 Mbps, at latitudes greater than 66° North.

Satellite communication systems also exist which comprise a constellation of satellites placed in very elliptical orbits, such as the Molniya or Toundra constellations, which make it possible to cover northern regions. However, these constellations exhibit an apogee situated at about 40000 km, thus giving rise to too considerable a unidirectional transit time, greater than 300 ms, and contributing to a degradation in the quality of service of the real-time communications with a terminal. Furthermore, these systems are optimized to offer a continuous service over just one of the two polar regions.

SUMMARY OF THE INVENTION

A first aim of the invention is to remedy the drawbacks of known satellite communication systems, and to achieve a satellite communication system for a continuous high-bitrate access service over a coverage area including at least one North or South polar region.

A second aim of the invention is to achieve a satellite communication system guaranteeing a unidirectional transit time of less than 150 ms and a high quality in respect of interactive telecommunications applications heavily constrained in real time, such as telephony and videophony.

A third aim of the invention is to minimize the cost of deploying and maintaining the constellation of satellites while avoiding the radiation belts, and to minimize the number of launches necessary for deploying and replacing failed satellites while minimizing fuel consumption.

Accordingly, the invention relates to a satellite communication system for a continuous high-bitrate access service over a terrestrial coverage area including at least one polar region, comprising a constellation of satellites placed in elliptical orbit around the Earth with an apogee at an altitude of less than or equal to 20000 km, user terminals located in the coverage area, and at least two anchor stations distributed on the surface of the Earth and able to ensure bidirectional communications with the user terminals by way of at least one orbiting satellite progressing above the coverage area. The system furthermore comprises a network of routers interconnected with one another and to the worldwide Internet network by dedicated local terrestrial communication pathways, each anchor station is connected to the worldwide Internet network by way of routers, and each anchor station comprises a management device able to control handovers of the communications between the orbiting satellites progressing successively above the coverage area, between the anchor stations, and simultaneous dual-handovers of the communications between satellites and anchor stations.

Advantageously, each anchor station, each router, each satellite and each user terminal can comprise a respective navigation receiver allowing them to synchronize amongst themselves and to synchronize all the handovers of the communications between the satellites and/or the anchor stations.

Advantageously, at each instant, the user terminals and the anchor stations ensuring the communications heading for the user terminals are situated in a visibility area of at least one satellite and in that the visibility areas of two consecutive satellites comprise an overlap area called the handover area, the handovers of the communications destined for a user terminal being carried out when the user terminal is situated in the handover area.

Advantageously, the system can furthermore comprise an operations planning centre connected to the anchor stations by way of the network of routers, the operations planning centre being able to regularly receive the ephemerides of each satellite of the constellation and to form a general plan of all the handovers of the communications to be carried out successively over time between the satellites and/or between the anchor stations.

Advantageously, each anchor station can comprise at least two steerable directional antennas respectively associated with two chains for emitting and receiving frequency-multiplexed signals, able to be pointed respectively towards two consecutive satellites of the constellation and to serve one or more user cells simultaneously by way of one or of two consecutive satellites of the constellation.

Advantageously, each user terminal comprises at least one directional antenna associated with at least one chain for emitting and receiving a radiofrequency signal over bidirectional radiofrequency linkups established by one or two anchor stations with one or two satellites of the constellation.

Advantageously, each satellite of the constellation can comprise two steerable directional antennas associated with chains for emitting and receiving radiofrequency signals for relaying radiofrequency links established by two different anchor stations towards user cells and switching means able to activate or interrupt one or more radiofrequency links established by one or the other of the two anchor stations with the user cells.

Advantageously, the system comprises at least two anchor stations situated inside or outside the coverage area.

According to a particular embodiment, the system comprises two coverage areas covering the two polar regions, arctic and antarctic, a constellation of satellites placed in elliptical orbit around the Earth, in a single orbital plane inclined by an angle of between 60° and 90° with respect to the terrestrial equatorial plane, the satellites being distributed around the Earth at an altitude of less than or equal to 20000 km, user terminals located within the two coverage areas consisting of the two polar regions at the latitudes of respectively greater than +60° and less than −60°, and at least one anchor station (34) per polar region.

According to another particular embodiment, the system comprises a coverage area including at least the two polar regions, arctic and antarctic, a constellation of satellites placed in elliptical orbit around the Earth, in several orbital planes equi-distant from one another and inclined by an angle of between 60° and 90° with respect to the terrestrial equatorial plane, the satellites being distributed around the Earth at an altitude of less than or equal to 20000 km, user terminals located in the coverage area, and a set of anchor stations distributed within or beyond the polar regions.

According to another particular embodiment, the constellation is placed on circular orbit plane(s) to provide service over a coverage area including one of the two polar regions, arctic and antarctic, and the handovers of the communications are carried out successively over time between the satellites and/or between the anchor stations, the satellites being equi-distributed around the Earth at an altitude of less than or equal to 20000 km.

BRIEF DESCRIPTION OF THE DRAWINGS

Other particular features and advantages of the invention will be clearly apparent in the subsequent description given by way of purely illustrative and non-limiting example, with reference to the appended schematic drawings which represent.

DETAILED DESCRIPTION

To relay communications in a maximum transit time interval of 150 ms per direction of communication, the invention consists in deploying a constellation of satellites in a low or medium altitude orbital plane around the Earth, according to an elliptical orbit 10, for example the elliptical orbit may be a circular orbit, and in connecting anchor stations GW1, GW2, GW3 to points of presence of the worldwide Internet network 33 by terrestrial communications means. In the case where the user coverage area 13 must be extended to regions of low latitudes, the constellation must be increased by several satellites deployed in other orbital planes of the same inclination and altitude as the initial orbital plane.

For example, when the user coverage area 13 relates to the two polar regions, North and South, at latitudes of greater than 60°, it is particularly advantageous to dispose the satellites S1, S2, . . . , Sk, in an equi-distributed manner in a circular orbit 10 at low or medium altitude, in a single plane inclined by an angle of between 60° and 90° with respect to the equatorial plane. The mono-plane configuration of the constellation makes it possible to minimize the number of satellites necessary to ensure service continuity over the two poles and also minimize the number of launches necessary for the deployment of the constellation. Furthermore, this makes it possible to minimize the number of launches for the replacement of a possible failed satellite, while decreasing the number of manoeuvres necessary and thus to optimize fuel consumption.

The choice of the altitude of the satellites of the constellation must take account of the maximum unidirectional transit time constraint fixed at 150 ms and must take account of the waveform transmission interval and minimum angles of elevation so that the anchor stations and the terminals can communicate with the satellites. The minimum angles of elevation depend on the operational constraints of the user terminals and the anchor stations. Generally, the minimum angle of elevation for the user terminals is greater than the minimum angle of elevation for the anchor stations. By way of nonlimiting example, the minimum angle of elevation can be chosen of the order of 5° for the anchor stations and of the order of 10 to 15° for the user terminals. In this case, to offer high-bitrate communications with a quality of service comparable to that of fixed and mobile terrestrial networks, it is advantageous that the altitude of the satellites be less than or equal to about 20000 km and that the anchor stations be able to be linked to the worldwide Internet network by terrestrial communication means to guarantee a unidirectional transit delay of less than 150 ms.

Figure 1A:
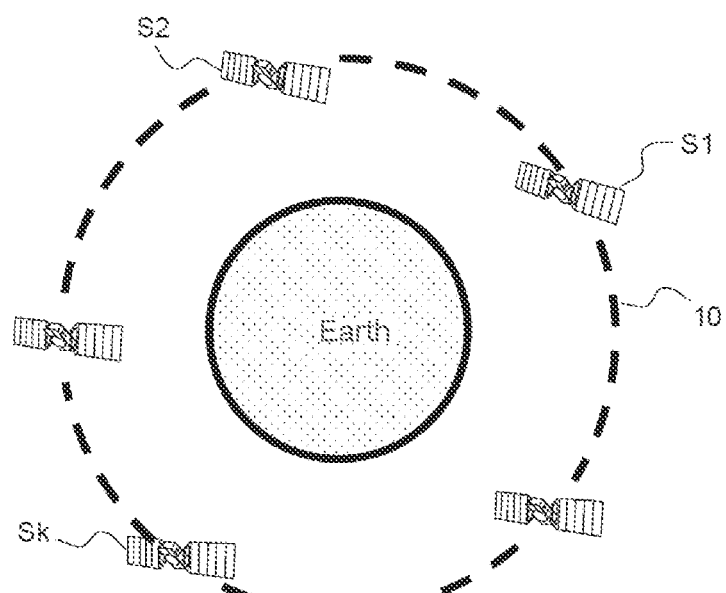
FIG. 1a: a diagram of a first exemplary constellation, according to the invention.

FIG. 1a illustrates a first exemplary constellation in accordance with the invention in which several satellites are placed around the Earth in a circular orbit passing above the two polar regions. The satellites S1, S2, . . . Sk, numbering five in the example, are placed in a single orbital plane inclined at an angle of between 80° and 90°, the angle of inclination being determined in a conventional manner, with respect to the equatorial plane. The orbit inclined by an angle of between 80° and 90° guarantees that the coverage achieved successively by each satellite as it progresses above the poles is uniform independently of the rotation of the Earth with respect to the orbital plane. To comply with the constraint of unidirectional transit time of less than 150 ms and to minimize the number of anchor stations having to be deployed to ensure service continuity over the two polar coverage areas, the altitude of the satellites may, for example, be about 7000 km. This makes it possible to ensure service continuity for the user terminals situated in the two polar coverage areas at latitudes of respectively greater than 60° N and than 60° S in the North and South hemispheres, and operating with a minimum angle of elevation, that may be chosen for example at 10°.

Figure 1B:
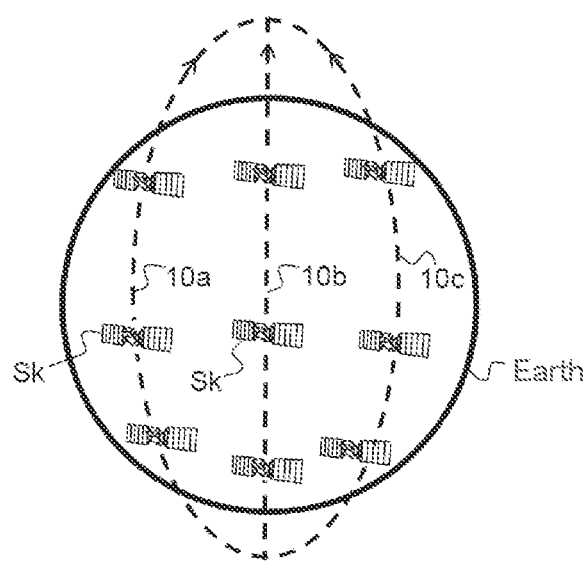
FIG. 1b: a diagram of a second exemplary constellation, according to the invention.

FIG. 1b represents a second exemplary constellation in accordance with the invention in which several satellites are placed around the Earth in various circular orbits 10a, 10b, 10c passing above the two polar regions. The satellites Sk are distributed around the Earth, in several orbital planes equidistant from one another and inclined by an angle of between 80° and 90° with respect to the terrestrial equatorial plane. For each orbital plane, the satellites are equi-distributed over the orbit at an altitude of less than or equal to 20000 km.

Figure 2:
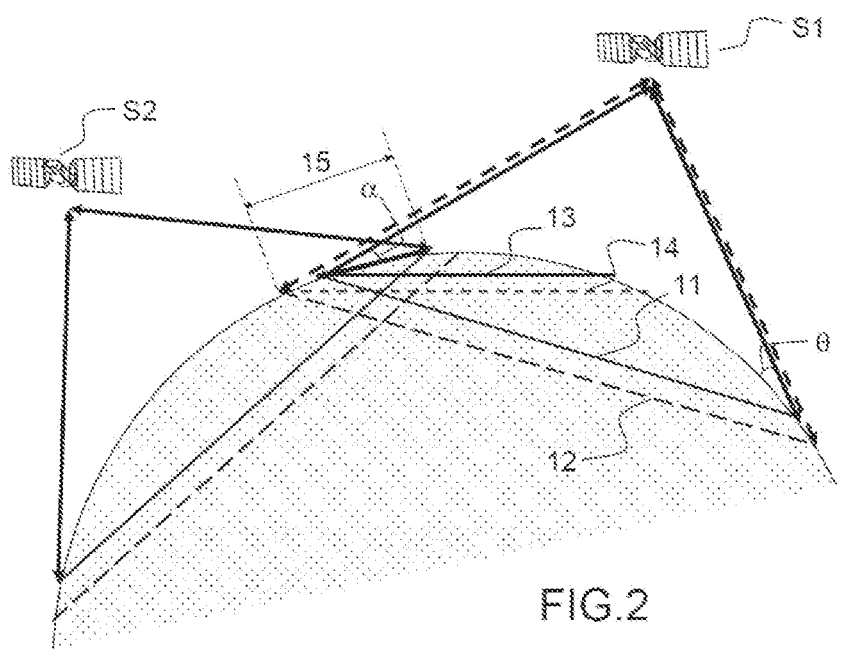
FIG. 2: a sectional schematic example illustrating the angles of minimum elevation of the anchor stations and of the terminals and the visibility areas of a satellite by user terminals and by anchor stations and a coverage area in which service continuity is ensured for the user terminals, according to the invention.
Figure 3:
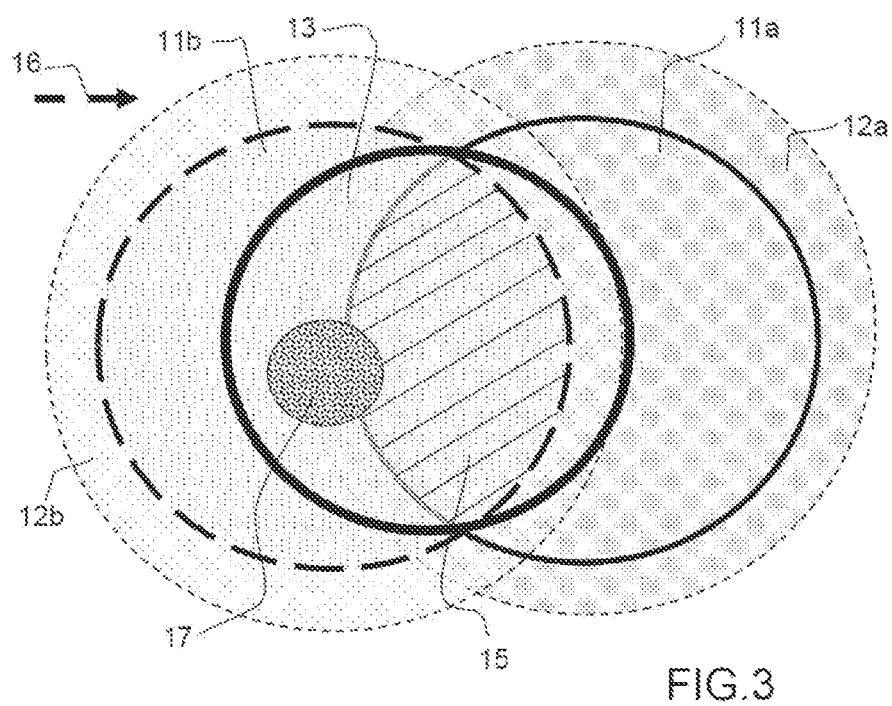
FIG. 3: a diagram illustrating the footprints on the Earth of various areas, seen by two consecutive satellites, according to the invention.

The minimum angles of elevation define a visibility area of the satellites by the user terminals and a visibility area of the satellites by the anchor stations. FIG. 2 represents a schematic example illustrating the minimum angle of elevation θ of the anchor stations and the minimum angle of elevation α of the user terminals and the limits of visibility areas 11, 12 of the satellite S1 by the user terminals and by the anchor stations as well as an exemplary coverage area limit 13 corresponding to the user terminals and of coverage area limit 14 corresponding to the anchor stations. The ground footprints of the various visibility areas of two consecutive satellites S1, S2 by the user terminals and by the anchor stations and of the coverage area are represented in FIG. 3. The visibility area 12a, 12b of the satellites by the anchor stations, called a station visibility area, is larger than the visibility area 11a, 11b of the satellites by the user terminals, called a user visibility area. Because of the progressing of the satellites above the coverage area, the ground footprint of the visibility areas of a satellite by the user terminals 17 and by the anchor stations are mobile over time. At each instant, the coverage area 13 is covered by one, two or even three consecutive satellites, each satellite being regularly replaced with another satellite immediately following it in the order of the direction of progress 16 above the coverage area 13. For example, for the two polar areas, the North hemisphere is covered by one, two or three consecutive satellites progressing above the North pole and the South hemisphere is covered by one, two or three other consecutive satellites progressing above the South pole. In FIGS. 2 and 3, the visibility areas of the two consecutive satellites S1 and S2 partially overlap, the overlap area 15 corresponding to an area of dual visibility.

For each coverage area including a polar region, North or South, the continuous service is achieved by one, two or three satellites which must relay the radiofrequency link between user terminals situated inside the coverage area and anchor stations which may be situated inside or outside the coverage area. A service can be delivered to a user terminal if at least one satellite is capable of simultaneously seeing the user terminal and an anchor station so as to relay the radiofrequency link between them. Accordingly, the satellite must have formed a beam towards the terminal and a beam towards the anchor station.

In accordance with the invention, the satellites being constantly in motion in the orbit 10 and the Earth being in rotation about the axis 18 joining the two poles, the communication system must regularly hand over the communications of the user terminals 17 from a first satellite S1 exiting the visibility area to a second satellite S2 entering the visibility area and/or from one anchor station to another anchor station.

The communication system must therefore support several types of handover to ensure service continuity.

The first type of handover consists of a change of satellite so as to maintain the radiofrequency link between a user terminal and an anchor station. This handover occurs when the user terminal and the anchor station are in the visibility area 15 of two successive satellites, S1, S2, also called the area of dual visibility or handover area.

The second type of handover consists of a change of satellite and of anchor station so as to maintain the communication between a user terminal and a point of presence of the Internet network 33 to which the telecommunication system is connected. This handover occurs when the user terminal is situated in the handover area 15 while its anchor station does not see the new satellite, thereby making it necessary to hand the radiofrequency link over to another anchor station seen by the new satellite.

The third type of handover consists of a change of anchor station. This handover intervenes when a user terminal is not in a handover area, that is to say when it is not seen by two consecutive satellites, but the anchor station which serves it is going to exit the visibility area of the satellite, thereby making it necessary to hand the radiofrequency link over to another anchor station seen by the same satellite.

In each of the first two types of handover, the communication system must allow two radiofrequency links to be established simultaneously for a minimum duration in order to organize the handover without interrupting the communication.

In the third type of handover, the system must allow the satellite to see the two anchor stations for a minimum duration so as to organize the handover.

The handovers are carried out in a handover area corresponding to the area of dual visibility 15 of two consecutive satellites. In this area of dual visibility where the terminals see the two consecutive satellites simultaneously, the two consecutive satellites can communicate with the terminals and with the anchor stations. The area of dual visibility of the two consecutive satellites makes it possible to have a minimum time period during which it is possible to carry out a handover of the communications between the terminals and anchor stations, of a satellite exiting the visibility area to another satellite entering the visibility area, without interrupting the communication and to thus ensure service continuity.

Each satellite comprises fixed or steerable directional antennas for forming respectively user beams with a progressing ground footprint called global cells and beams with a fixed ground footprint called user cells for overlapping all or part of the coverage area 13.

Furthermore each satellite comprises steerable directional antennas for forming station beams with a fixed ground footprint for the anchor stations.

The user beams are steerable and can be directed towards any place in the coverage area according to the traffic demand thereby making it possible to locally increase the resources in terms of bandwidth or service bitrate. The direction of pointing of each beam is tailored continuously so as to compensate for the motion of the satellite. The tailoring can be carried out by mechanical or active or hybrid antennas. The tailoring makes it possible to obtain, for each beam, a fixed ground footprint. The global beam is fixed with respect to the satellite but its ground footprint is mobile and follows the motion of the satellite. Its ground footprint corresponds to the visibility area of the satellite by the user terminals. The station beams can be pointed towards anchor stations situated at any place in the visibility area of the satellite by the anchor stations.

The anchor stations may be deployed inside or outside the coverage area but must be located in proximity to terrestrial communication means allowing their interconnection to the Internet network, the terrestrial communication means being able to be for example a network of optical fibres or terrestrial RF beams.

Currently, deployment of the anchor stations outside the coverage area is necessary for the South pole since interconnection with the worldwide Internet network by terrestrial means is possible only on the South-American continent, for example the South of Chili, on the Oceanian continent, for example the South of New-Zealand, or on African continent, for example South Africa. These continents are situated at latitudes outside of the coverage area. However, for the North pole, the anchor stations can be deployed inside the coverage area.

Furthermore, the operational constraint of minimum angle of elevation of the anchor stations in order to allow correct communications must be complied with. Two anchor stations suffice to ensure a continuous service over an area in proximity to the anchor stations.

Concerning the poles, three anchor stations spaced angularly apart with respect to the pole can be used to ensure a continuous service over the whole of the user coverage area including a polar region delimited by the latitude 60°. The angular spacing in longitude between two anchor stations must ideally be between 80° and 160° to compensate for the rotation of the orbital plane around the Earth and thus ensure continuous service over any part of the coverage area delimited by a latitude. The three anchor stations may for example be distributed around the coverage area so as to form three vertices of a triangle centred on the axis of rotation of the Earth.

Figure 4:
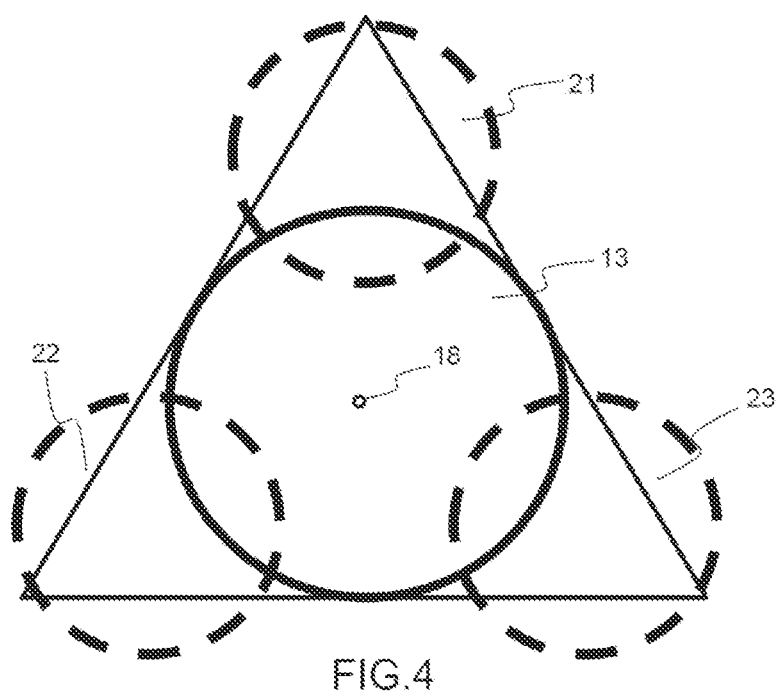
FIG. 4: an example of areas of implantation of three anchor stations making it possible to ensure continuous service throughout the coverage area including a pole, according to the invention.

As represented for example in FIG. 4, the three anchor stations may be disposed outside the coverage area, for example in three respective areas 21, 22, 23 spaced angularly around the coverage area 13 and therefore around the North/South axis of rotation 18 of the Earth when the coverage area is a pole.

Depending on the placement of the various user terminals in the coverage area and the placement of the anchor stations inside or outside the coverage area, various successive handover phases may be necessary during the progress of two consecutive satellites above each coverage area.

Figure 5:
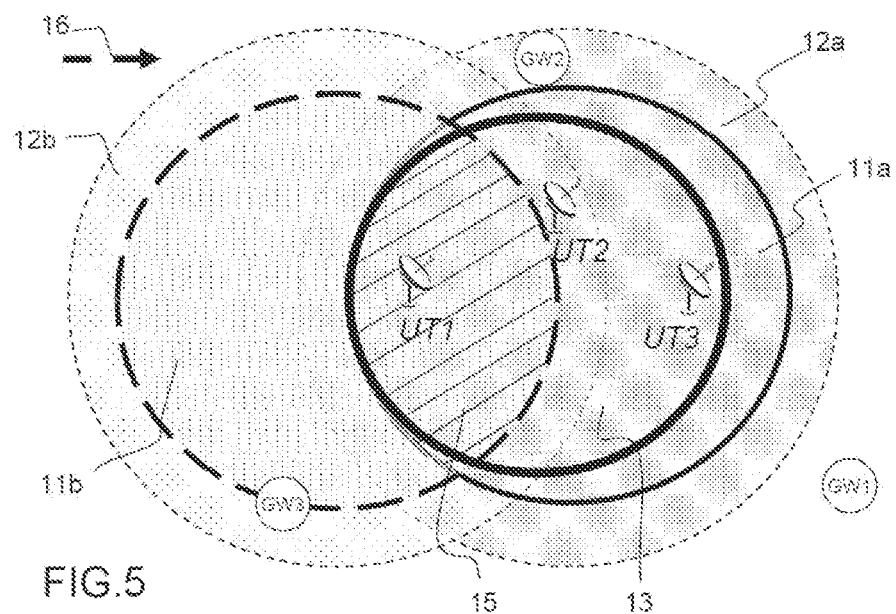
FIG. 5: a first phase of a handover scenario for a user terminal covered by a global beam with ground mobile footprint requiring a dual-handover in the case of an exemplary ground configuration of three user terminals situated in the coverage area and of three anchor stations situated outside the coverage area, according to the invention.

FIG. 5 represents a first handover phase requiring a dual-handover of anchor station and of satellite. In this example, three user terminals UT1, UT2, UT3 are situated in the coverage area 13 and three anchor stations GW1, GW2, GW3 are situated outside the coverage area. In this example, all the user terminals are served by a global beam originating from a satellite. The direction 16 of progress of the satellites, represented by the dotted arrow, is assumed to be a horizontal progress from left to right in FIG. 5. The visibility areas of the two consecutive satellites, respectively entering and exiting, proceed in the same direction as the satellites, therefore from left to right. In this example, all the user terminals UT1, UT2, UT3 situated in the coverage area 13 are served by the anchor station GW2 by the exiting satellite since the anchor station GW2 is located inside the visibility area of the exiting satellite. However, the user terminal UT1 currently situated in the area of dual visibility 15 of the two satellites, that is to say in the handover area, will soon exit the user visibility area 11a of the exiting satellite. It will therefore be necessary to hand this user UT1 over to the entering satellite. As the anchor station GW2 is not situated in the station visibility area 12b of the entering satellite, it will also be necessary to hand the user UT1 over to the anchor station GW3 which is the only one situated in the station visibility area 12b of the entering satellite. In this exemplary configuration, to ensure the continuity of the service, a dual-handover must therefore be carried out so as to simultaneously replace the exiting satellite with the entering satellite and the anchor station GW2 with the anchor station GW3. No handover is necessary for the user terminals UT2 and UT3 situated outside the handover area 15.

Figure 6:
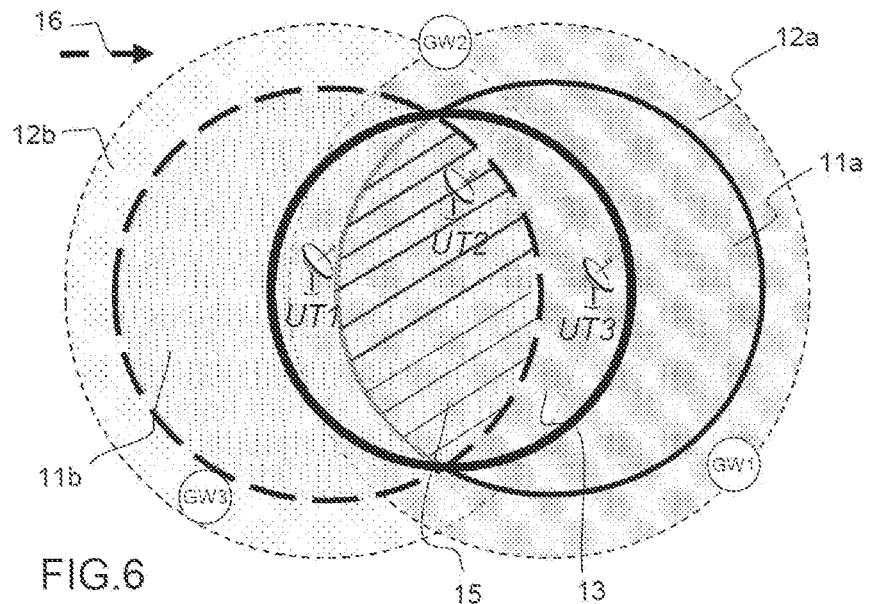
FIG. 6: a second handover phase corresponding to the example of FIG. 5, according to the invention.

For the same ground configuration of the user terminals and of the anchor stations as that of FIG. 5, as represented in FIG. 6, after the handover of the user terminals UT1 which are now served by the anchor station GW3 by way of the entering satellite, a second handover phase is necessary. This second handover phase comprises a dual-handover of anchor station and of satellite for one of the users UT2 as described in conjunction with FIG. 5, and a simple anchor station handover for a second user UT3. Indeed, given the direction 16 of the motion of the entering and exiting satellites, the user terminal UT2, currently situated in the handover area 15, will soon exit the user visibility area 11a of the exiting satellite. The user terminal UT2 therefore finds itself in the same situation as the terminal UT1 in the first handover phase and must therefore undergo the same type of handover as that described in conjunction with FIG. 5. Furthermore, the anchor station GW2 which currently serves the user terminal UT3 by way of the exiting satellite will soon exit the station visibility area 12a of the exiting satellite and is not yet in the station visibility area 12b of the entering satellite, it is therefore necessary to hand the user terminals UT3 over to another anchor station GW1 which is currently situated in the station visibility area 12a of the exiting satellite.

Figure 7:
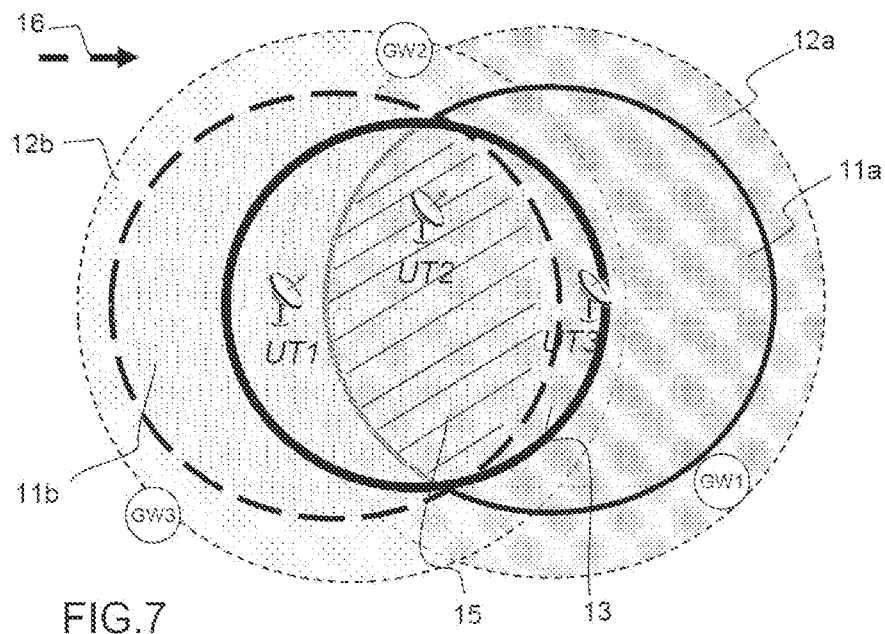
FIG. 7: a third handover phase corresponding to the example of FIG. 5, according to the invention.

For the same ground configuration of the terminals and of the anchor stations as that of FIG. 5, as represented in FIG. 7, after the handover of the user terminals UT1 and UT2 which are now served by the anchor station GW3 by way of the entering satellite and the handover of the user terminals UT3 which are now served by the anchor station GW1 by way of the exiting satellite, a third handover phase is necessary. Indeed, the anchor station GW3 will soon exit the station visibility area 12b of the entering satellite and will no longer be able to serve the user terminals UT1 and UT2. It is therefore necessary to hand these two user terminals over to the anchor station GW2.

Figure 8:
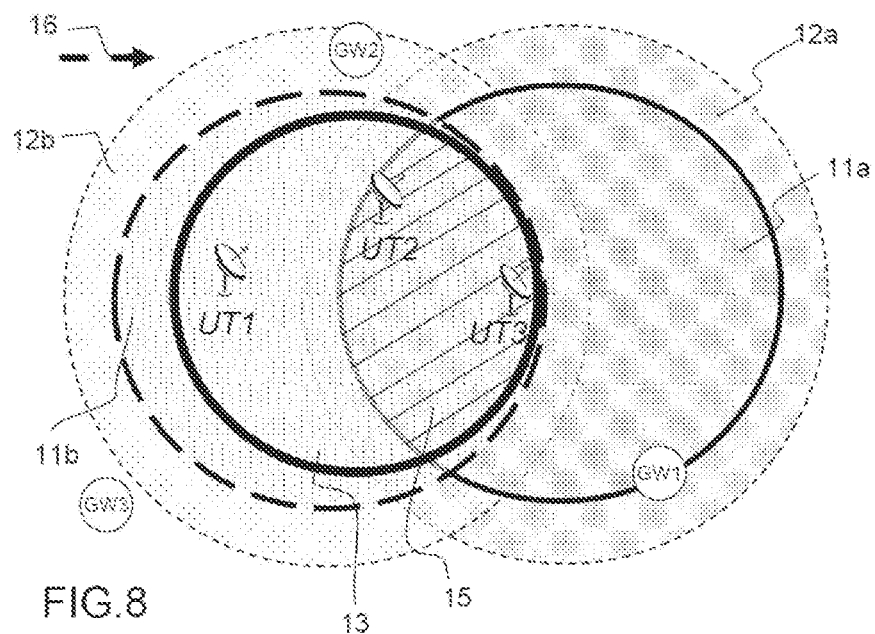
FIG. 8: a fourth handover phase corresponding to the example of FIG. 5, according to the invention.

For the same ground configuration of the terminals and of the anchor stations as that of FIG. 5, as represented in FIG. 8, a fourth handover phase is necessary. Indeed, the user terminal UT3 is now situated in the handover area 15 and will soon exit the user visibility area 11a of the exiting satellite. It is therefore necessary to hand it over to the entering satellite as well as to the anchor station GW2 which is in a station visibility area 12b of the entering satellite. No handover of the other user terminals UT1 and UT2 is necessary in this fourth phase.

The four phases described in conjunction with FIGS. 5 to 8 repeat in tempo with the progress of the satellites and the handover procedures can therefore be programmed in advance.

Figure 9:
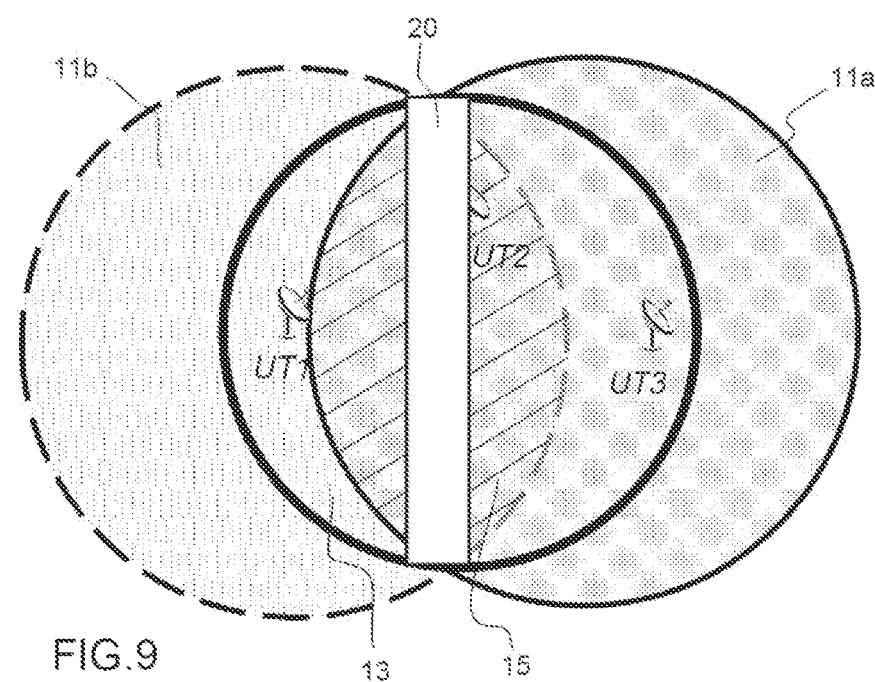
FIG. 9: an example of progressive handover of the user terminals situated in the area of intersection of the visibility areas of two consecutive satellites, according to an embodiment of the invention.

According to the size of the user cells, the procedure for handing the user terminals over from one radiofrequency link to the other can be carried out in a progressive or simultaneous manner. When the diameter of the user cell is greater than the minimum width of the area of dual visibility 15, handover of the terminals can only be carried out progressively. In the other cases, there is the choice between progressive or simultaneous handover of the terminals. FIG. 9 illustrates an example of progressive handover with the highlighting of the area of dual visibility 15 in which the handover of the terminals can be performed. The whole set of terminals covered by a global beam can be handed over as this area of dual visibility 15 moves at the speed of progress of the satellites.

Figure 10:
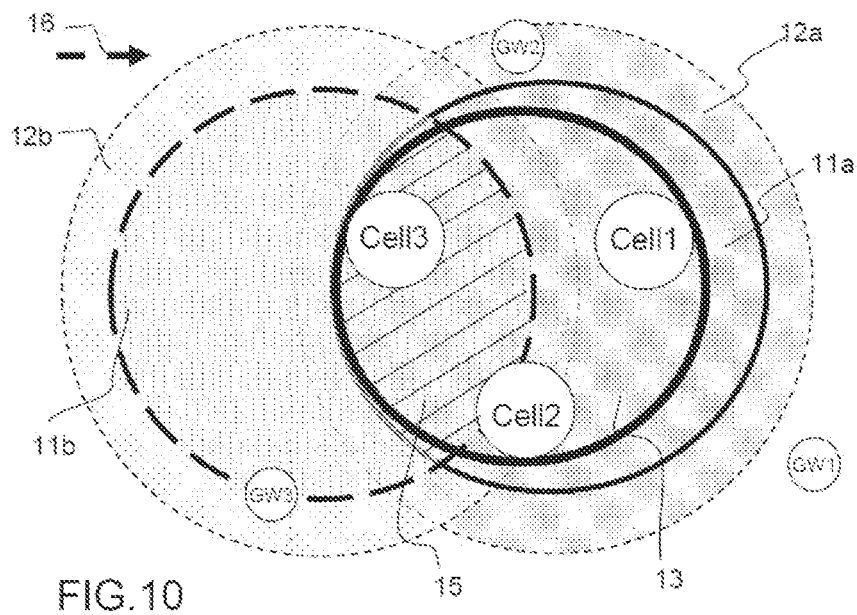
FIG. 10: an exemplary scenario in which user terminals are situated in three user cells cell1, cell2, cell3 located at various places in the user coverage area, the three anchor stations being situated outside the user coverage area, according to an embodiment of the invention.
Figure 11A:
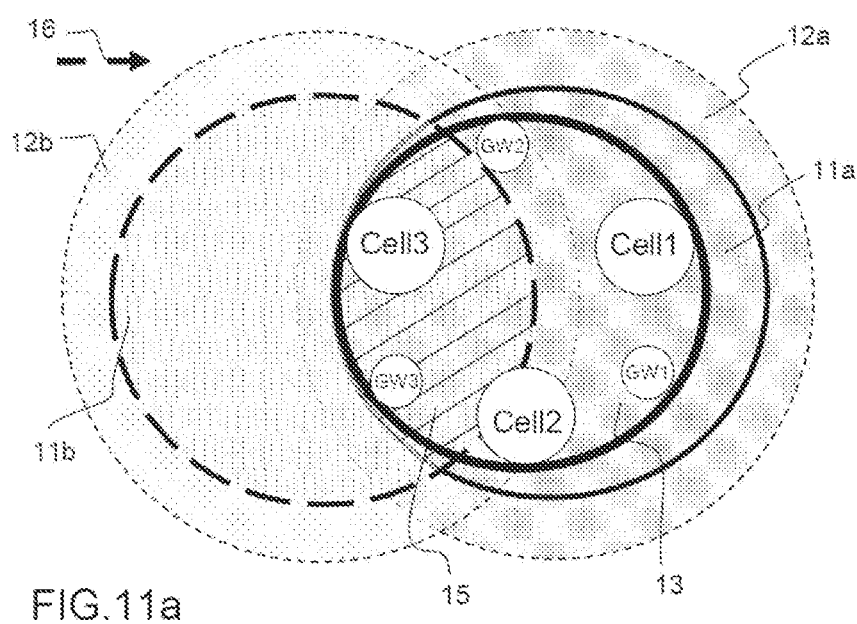
FIG. 11a: an exemplary scenario in which user terminals are situated in three user cells cell1, cell2, cell3 located at various places in the user coverage area, the three anchor stations being situated inside the user coverage area, according to another embodiment of the invention.
Figure 11B:
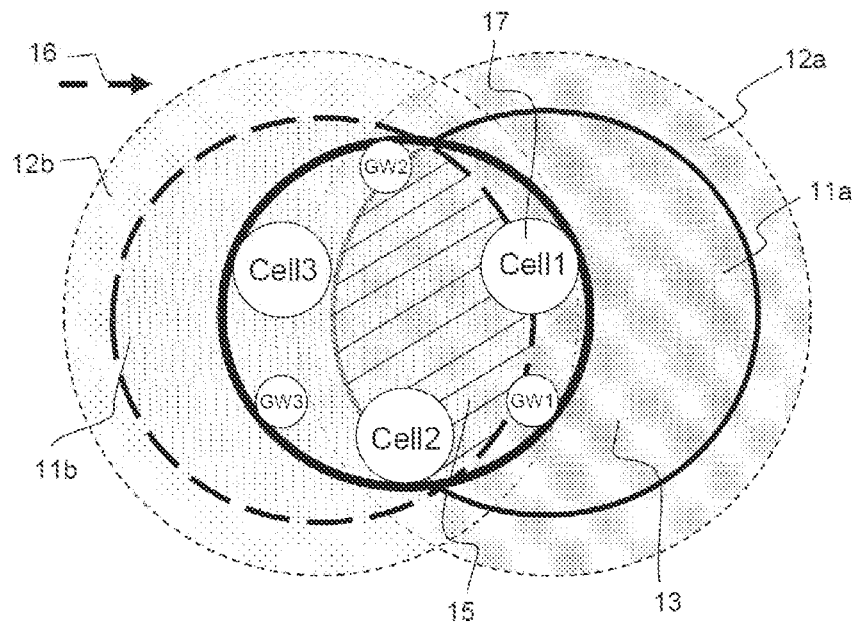
FIG. 11b: a handover phase corresponding to the example of FIG. 11a, according to the invention.

FIGS. 10, 11a, 11b represent examples of configuration in which user terminals are situated in three different user cells cell1, cell2, cell3 located at various places in the coverage area. In the example of FIG. 10, the three anchor stations GW1, GW2, GW3 are distributed outside the coverage area 13. In FIGS. 11a and 11b, three anchor stations GW1, GW2, GW3 are distributed inside the coverage area 13, in three different regions. The deployment of the anchor stations inside the coverage area is conceivable only at the North pole where there are Internet points of presence inside the coverage area. In the configuration of FIG. 10, the user cells cell1 and cell2 are served by the anchor station GW2 by way of the exiting satellite and do not require any handover, whereas the user cell cell3 currently served by the anchor station GW2 by way of the exiting satellite will have to hand over to the anchor station GW3 and to the entering satellite.

In the configuration of FIG. 11a, the user cell cell1 is served by the anchor station GW1 by way of the exiting satellite, the user cell cell2 is served by the anchor station GW2 by way of the exiting satellite and the user cell cell3 is served by the anchor station GW3 by way of the entering satellite. No handover is necessary for the moment.

FIG. 11b represents a handover phase requiring a satellite handover, for a ground configuration of the user cells 17 and of the anchor stations which is identical to that of FIG. 11a. In this example, the user cell cell2 served by the anchor station GW2 by way of the exiting satellite is situated in the handover area 15 and will soon exit the station visibility area 12a of the exiting satellite. It is therefore necessary to collectively hand over all the user terminals of this cell cell2 to the entering satellite. No anchor station handover is necessary.

For the mobile user terminals of one user cell to another user cell, the communication system can also organize individual handovers.

Figure 12:
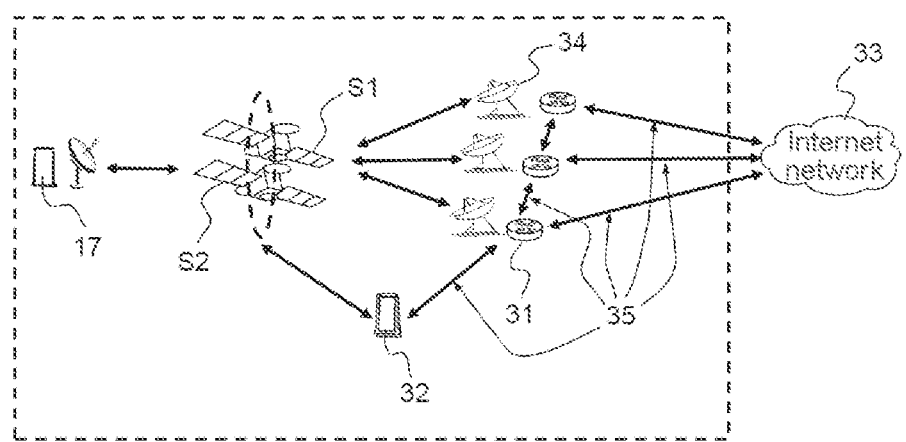
FIG. 12: an exemplary global architecture of the satellite communication system, according to the invention.
Figure 19:
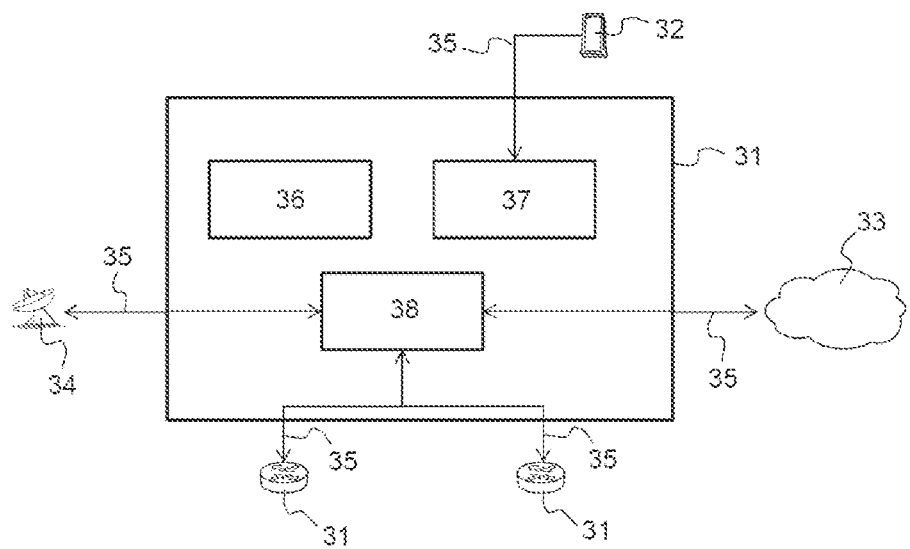
FIG. 19: a diagram of an exemplary architecture of a router, according to the invention.

FIG. 12 illustrates an exemplary global architecture of the satellite communication system, according to the invention. The communication system comprises user terminals 17 and anchor stations 34 which serve the user terminals by way of one or two satellites S1, S2 of the constellation. The mission of the satellites is to relay in a transparent manner the radiofrequency links established between one or more anchor stations and a set of user cells distributed in the coverage area 13. Each anchor station 34 is connected to the Internet network 33 by way of a network of routers 31. The routers 31, an exemplary architecture of which is represented in FIG. 19, are mutually interconnected by dedicated local communication pathways 35 and route the traffic between the user cells 17 and the Internet network 33 by way of the anchor stations 34. Each router 31 comprises a navigation receiver 36, a device for managing the handovers 37 and a routing device 38 for the traffic exchanged between each user cell and an access point of the Internet network 33. Each router 31 is responsible for the splitting or for the duplication of the traffic between the other routers and the anchor stations 34 serving the user cells. Furthermore, the communication system comprises a network operations planning centre 32 (Network Operation Centre or NOC) which determines the occurrences and the types of handover which must be executed over time by the satellites, the anchor stations and the routers, for each of the user cells or for each of the isolated terminals in the coverage area 13 covered by a global beam. Each of the routers, anchor stations and satellites are equipped with a navigation receiver which allows them to synchronize temporally with the network operations planning centre 32. The network operations planning centre 32 is linked to each of the anchor stations and to each router by the terrestrial communication pathways 35 as well as to the satellites by way of command, measurement and telemetry stations (Telemetry, Command and Ranging Station or TCR) which are in radiofrequency link with all the satellites of the constellation. The operations planning centre 32 is capable of monitoring the satellites, the anchor stations and the routers via a dedicated local communication network and is capable of precisely time-stamping the handovers to be carried out by virtue of a navigation receiver. It communicates this time-stamped handover plan to the satellites and to the anchor stations for synchronized execution of all the handovers.

The operations planning centre 32 regularly receives the real ephemerides of each satellite S1, S2, ... , Sk of the constellation, where k is an integer number greater than one. On the basis of the ephemerides received, the operations planning centre 32 calculates and plans all the handovers that each anchor station 34 must control over time. The general handover plan is carried out for each user cell 17 of the coverage area 13 and comprises the initial instant and the interval during which the handover must be carried out, the type of handover to be carried out and which satellite and/or which anchor station is concerned. The operations planning centre 32 regularly transmits updates of the general handover plan to all the anchor stations 34, to the satellites S1, S2, ... Sk and to the routers 31.

Figure 13:
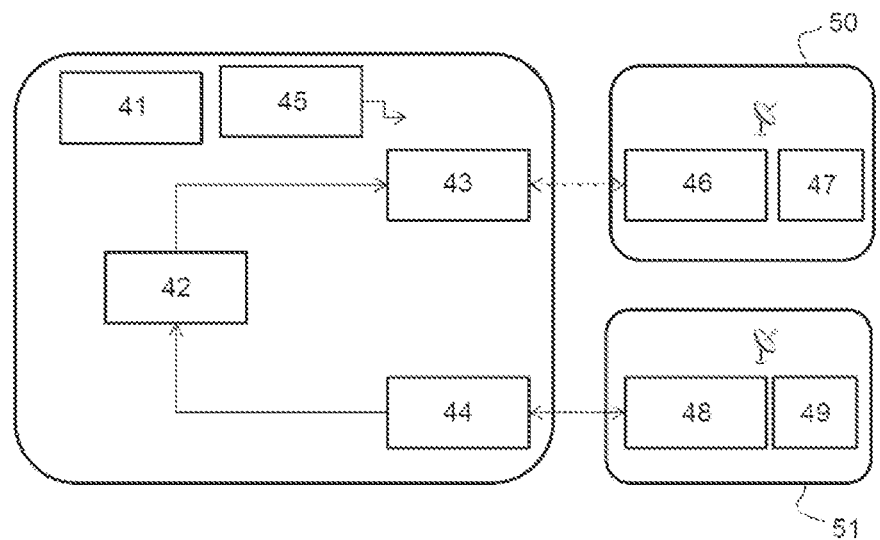
FIG. 13: a schematic diagram of an exemplary architecture of an anchor station, according to the invention.

By virtue of the general handover plan transmitted by the operations planning centre 32, each anchor station 34 knows at any moment the user cells 17 that it must serve with a user beam or the area that it must serve with a global beam and by way of which satellite. As represented schematically in the exemplary architecture of FIG. 13, to carry out the handovers between two satellites, each anchor station 34 must comprise at least two systems of steerable directional antennas 50, 51, each system of antennas allowing the tracking of a satellite. Each system of antennas comprises an emission and reception antenna respectively associated with a dedicated emission and reception chain 46, 48 and with a dedicated monitor unit 47, 49. Each system of antennas is able to track the satellites anywhere above a predetermined minimum angle of elevation, for example equal to 5°, and is able to emit and to receive modulated radiofrequency signals to each user cell, on outbound and inbound linkups, simultaneously by way of two satellites of the constellation. Each anchor station 34 comprises an interface 42 with a router 31 connected to the Internet network via a point of presence 33, and two modulation and demodulation devices 43, 44 called modems, connected to the interface 42 and linked to each of the two systems of emission and reception antennas 50, 51 to ensure a continuous permanent service. Each anchor station is thus capable of pointing its antennas towards two different satellites to simultaneously serve user cells by way of the two satellites. Furthermore, each anchor station comprises several modulation and demodulation devices making it possible to serve all the user cells of a coverage area by way of a single satellite. Each anchor station comprises a navigation receiver 41 to receive navigation signals originating from a navigation system, for example of GNSS (Global Navigation Satellite System) type so as to synchronize with the other anchor stations, with the operations planning centre 32 and with the various satellites. Each anchor station 34 is responsible for the allocation and for the management of the radiofrequency resources at the various user terminals 17 on the outbound and inbound linkups of two of the constellation's consecutive satellites S1, S2 at which its antennas are pointed as well as for the management of the various handovers. Accordingly, each anchor station comprises a resources and handovers management device 45 linked to the two monitor units 47, 49 for the two systems of antennas 50, 51. The resources and handovers management device 45 updates the list of user terminals that are located in each cell, their connection statuses and their requests for services. Furthermore, the resources and handovers management device 45 comprises a general plan of the radiofrequency resources which defines the configuration of all the carriers used in the user cells, such as the frequency of the carriers, the modulation code, the bitrate of the data, and the transmission window. The dynamic allocation of the radiofrequency resources to the user terminals depends on the bandwidth requirements requested by each user terminal.

The anchor stations execute the handovers programmed by the operations planning centre 32.

Figure 14A:
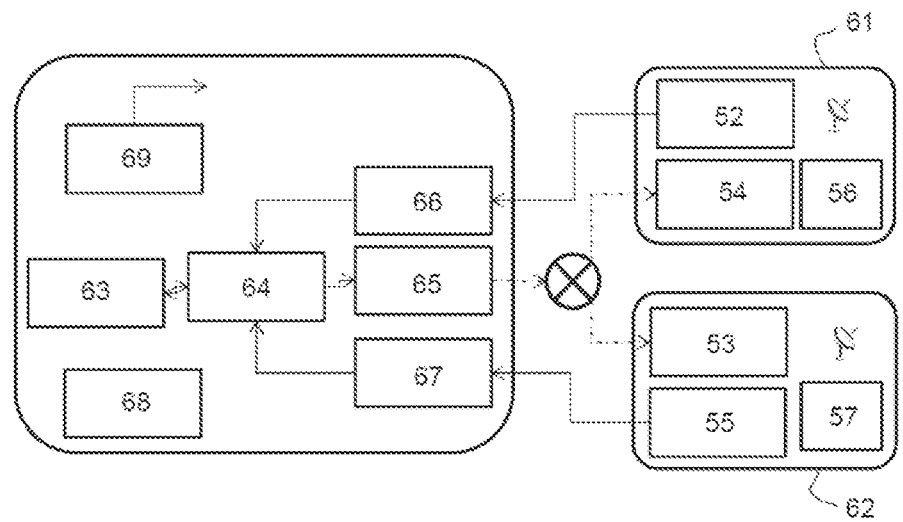
FIGS. 14a, 14b and 14c: three schematic diagrams corresponding to three examples of user terminal architecture, according to the invention.
Figure 14B:
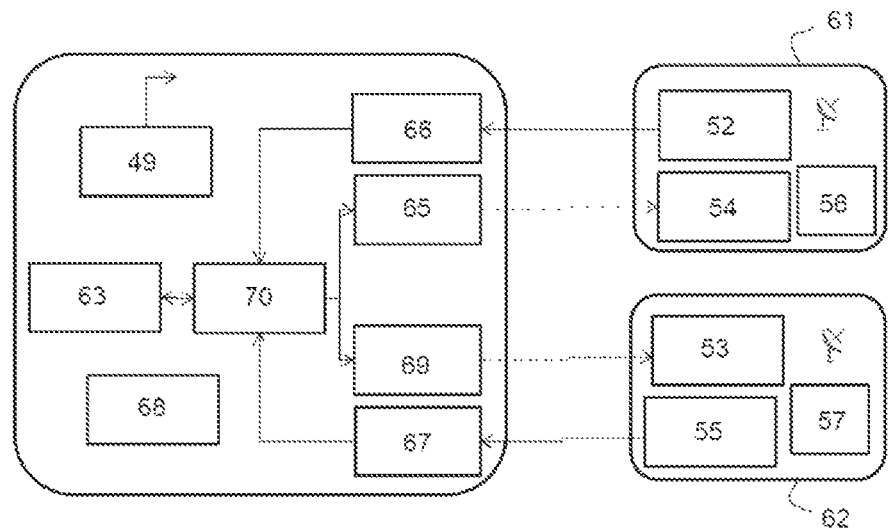
Figure 14C:
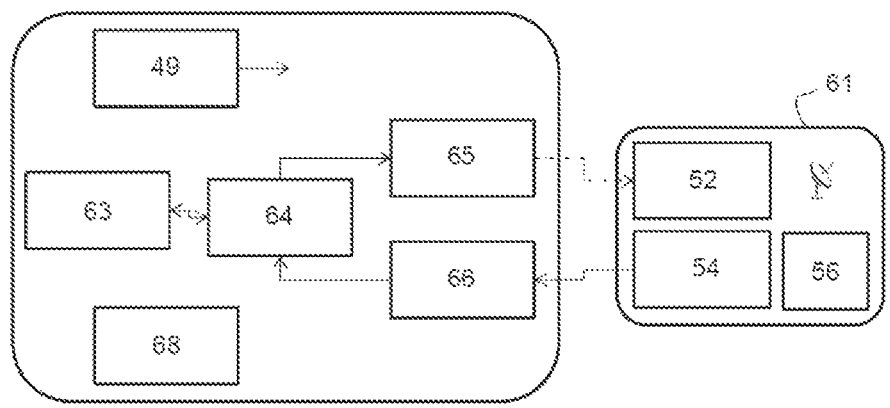

As represented in the examples of FIGS. 14a, 14b and 14c, each user terminal can comprise one or two directional emission and reception antennas 61, 62 able to track a satellite so as to establish a radiofrequency linkup. Each antenna is associated with a respective emission chain 52, 53, with a respective reception chain 54, 55 and with a respective monitor unit 56, 57 and is capable of operating with an angle of elevation greater than a predetermined minimum angle of elevation. The angle of elevation of the user terminals may for example be between 10° and 90°. The presence of two antennas makes it possible to ensure a permanent service without temporary interruption when the direction of pointing has to be modified. Indeed, with two antennas it is possible to simultaneously establish a first bidirectional radiofrequency linkup with a first satellite and a second bidirectional radiofrequency linkup with a second satellite before carrying out the handover of the communications from the first satellite to the second satellite. In FIG. 14a, each user terminal comprises an interface 63 intended to be linked to a local terrestrial communication network and a signals coder/decoder device 64 linked at emission to a modulator 65 and at reception to a first demodulator 66 and to a second demodulator 67. The modulator 65 and the first demodulator 66 make it possible respectively to emit and to receive signals towards an anchor station 34 by way of a first satellite S1. The second demodulator 67 makes it possible to synchronize signals relayed by a second satellite S2, the relayed signals originating from an outbound linkup of the same anchor station 34. This makes it possible to prepare the user terminal for a satellite handover without interrupting the communication established on the outbound linkup. The modulator 65, the first demodulator 66 and the second demodulator 67 are linked to the two emission and reception antennas 61, 62. If required, in order to simultaneously transmit signals to the user terminals by way of two different satellites, it is possible to add a second modulator so as to avoid losing data packets on the inbound linkup. In FIG. 14b, the user terminal comprises a first modulator 65 and a first demodulator 66 linked to the first emission and reception antenna 52 and a second modulator 69 and a second demodulator 67 linked to the second emission and reception antenna 53. The two modulators 65, 69 and the two demodulators 66, 67 are linked to the interface 63 by way of a multiplexer 70. In FIG. 14c, the user terminal comprising only a single emission and reception antenna 61, a single modulator 65 and a single demodulator 66 are necessary. In the case of a single antenna, it is not possible to simultaneously establish a first bidirectional radiofrequency linkup with a first satellite and a second bidirectional radiofrequency linkup with a second satellite and a service interruption will occur during handover of the satellites.

Each user terminal is regularly informed by the anchor stations regarding the updated ephemerides corresponding to each satellite, regarding the planned handovers corresponding to the cell in which it is situated, regarding the carrier frequencies to be used for the emission and the reception of the signals with the new satellite, and regarding the location of the anchor stations. Each user terminal is equipped with a navigation receiver 68 making it possible to synchronize its internal clock and to obtain temporal information relating to the various anchor stations, to the operations planning centre and to the various satellites. Each user terminal determines the time windows during which it can hand over a satellite according to the planned procedure and steers the pointing of its free antenna towards the new satellite.

Figure 15:
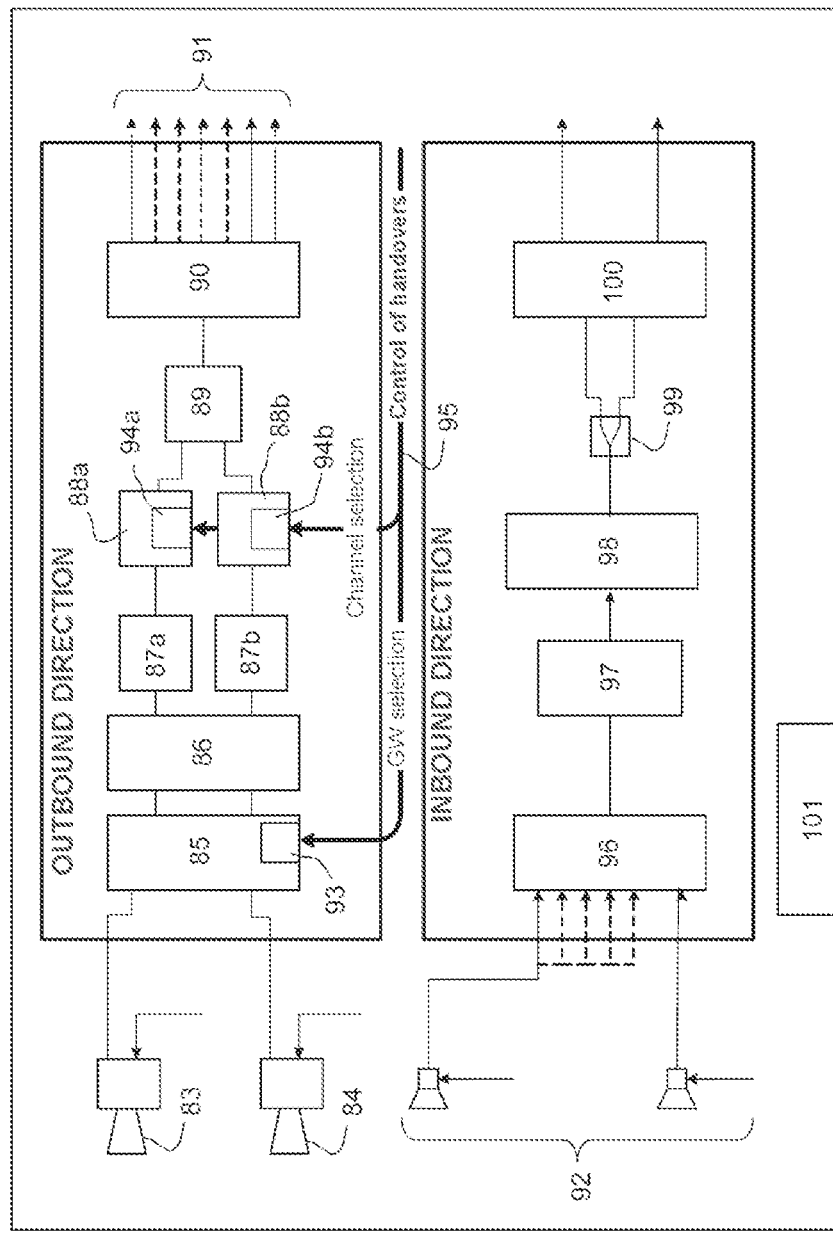
FIG. 15: a diagram of an exemplary architecture of the payload of a satellite of the constellation, according to the invention.

FIG. 15 represents an exemplary architecture of the payload of a satellite Sk of the constellation in the case of a dual-mission with multibeams and with global beam. In this example, the payload of the satellite can simultaneously serve p user cells on the basis of two different anchor stations and a global coverage area. Each user cell can be served by one or the other of the two anchor stations. When a user cell has to undergo an anchor station handover, the satellite is capable of simultaneously pointing its two directional antennas towards the two anchor stations which are concerned in the handover. The payload of the satellite comprises two directional emission and reception antennas 83, 84 intended, in the outbound direction, to receive multiplexed radiofrequency signals originating from two different anchor stations. The two antennas are connected to two respective radiofrequency chains making it possible to route the signals originating from two anchor stations towards user cells where user terminals are situated. Each radiofrequency chain comprises a low noise amplifier 85, a frequency converter 86 making it possible to pass from the reception frequency band to the emission frequency band, a demultiplexer 87a, 87b making it possible to separate the signals into p independent channels operating in p different frequency bands intended to serve p different user cells and p channel amplifiers 88a, 88b making it possible to tailor the gain of each channel. At their output, the channel amplifiers, of the two radiofrequency chains, which amplifiers are dedicated to one and the same frequency, are linked pairwise by p signal combiners 89 before being amplified by power amplifiers 90 and then transmitted on the one hand by p emission and reception antennas in the form of p different beams 91 to the user cells. To make it possible to ensure handovers between two anchor stations without interrupting the service, the low noise amplifier 85 of each radiofrequency chain is furnished with a switching device 93 making it possible to activate or to deactivate the reception of the signals on the antenna corresponding to which it is linked and to thus select the signals originating from a predetermined anchor station GW. The switching device 93 can be actuated before and after each anchor station handover. Furthermore, each channel amplifier 88a, 88b also comprises a switching device 94a, 94b making it possible to activate or to deactivate a channel and to thus select the anchor station which will serve a predetermined user cell during an anchor station handover. The signals controlling activation or deactivation 95 of the low noise amplifiers and of the channel amplifiers are controlled by the onboard computer on the basis of the general handover plan dispatched by the operations planning centre 32. The navigation receiver 101 allows the satellite to synchronize the execution of the handovers with the anchor stations 34, the routers 31 and the user terminals 17 of the communication system.

In the inbound direction, p beams of radiofrequency signals originating from the p user cells are received by the p emission and reception antennas 92 and processed by a radiofrequency chain. The radiofrequency chain comprises p low noise amplifiers 96, a signal multiplexer 97 in which the signals of the p beams received are combined in frequency. The combined signals are frequency converted in a converter 98 and then divided into two independent multiplexed radiofrequency signals by a power divider 99 before being amplified by amplifiers 100 and transmitted by the two directional antennas 83, 84 to two different anchor stations.

This architecture allows an operation of handover of the communications of a user cell between two anchor stations without changing satellite.

Figure 16:
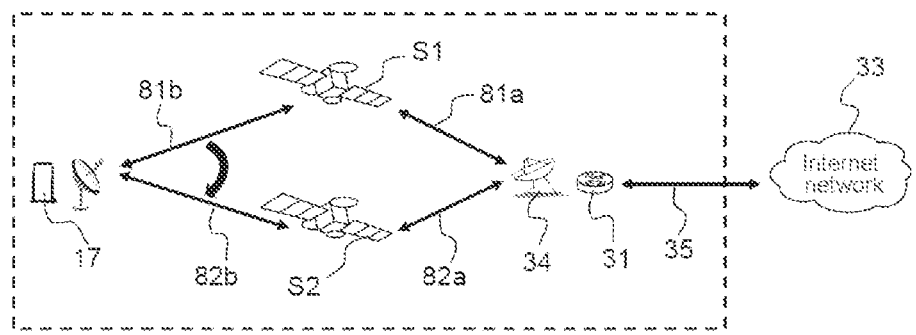
FIG. 16: a diagram of an exemplary handover of the radiofrequency links between two satellites, according to the invention.

A handover of the communications between two satellites must be executed when a user terminal can continue to be served by the same anchor station, but the satellite which relays the communications between the user terminal and the anchor station has to be replaced with another satellite as represented in the diagram of FIG. 16. In this case, the handover of the service from the first satellite S1 to the second satellite S2, programmed by the operations planning centre 32, is initiated by the anchor station 34. Before handover, the anchor station 34 which ensures the service for the user cells 17, comprises a first antenna pointed towards a first satellite S1, the communications between the anchor station 34 and the first satellite being carried out through the first bidirectional radiofrequency linkup 81a. The user terminals 17 located in the user cells also have their first antenna pointed towards the first satellite S1 with which they communicate by way of the bidirectional radiofrequency linkup 81b. To carry out a handover, the anchor station 34 synchronizes its internal clock with the clock of the second satellite S2 and compensates for the Doppler effect, that is to say the shift of the carrier frequency, due to the motion of the second satellite with respect to the anchor station. The Doppler effect compensation consists of a resetting of the carrier frequencies used on the radiofrequency linkup between the anchor station and the second satellite. The anchor station thereafter points its second antenna towards the second satellite S2. When pointing has terminated, the anchor station 34 can begin to emit and receive radiofrequency signals on the second radiofrequency linkup 82a with the second satellite S2 by using the same carrier frequencies as those used on the first radiofrequency linkup 81 with the first satellite. As soon as the second radiofrequency linkup 82a is established, the second satellite S2 can then relay the radiofrequency signals between the anchor station 34 and the user terminals 17. The anchor station then dispatches a control signal to the user terminals by way of its first antenna and of the first satellite S1 so that the user terminals 17 point their second antenna towards the second satellite S2. As soon as the pointing of the second antenna of the user terminals has terminated, the user terminals dispatch a message to the anchor station by way of their first antenna and of the first satellite S1 so that it removes the first radiofrequency linkup 81a with the first satellite S1, and then they can cut their first radiofrequency linkup 81b to the first satellite and begin to emit on the second bidirectional radiofrequency linkup 82b with the second satellite S2. The user terminals also dispatch a specific signal on the second radiofrequency linkup 82b to the anchor station 34 by way of their second antenna and of the second satellite S2. The specific signal allows the anchor station to measure errors of synchronization of time and of frequency of the user terminals and to transmit to the user terminals, by way of the second satellite, orders for correction of the measured errors so as to allow the synchronization of the data transmitted on the outbound and inbound linkups. The anchor station also dispatches a control signal to the first satellite so that it stops relaying the signals between the anchor station and the radiofrequency terminals, and then the anchor station stops transmitting communications on the first radiofrequency linkup with the first satellite. This satellite handover procedure is particularly advantageous since it avoids having to transmit data simultaneously on two radiofrequency linkups 81a, 82a by way of two satellites and allows the user terminals to require just a single modulator and a single coder as represented in FIG. 14b instead of two. However, during the time necessary for the synchronization of the user terminals, there may be a slight interruption of the service if the user terminals have cut their linkup with the first satellite before synchronization is established. If it is desired to avoid any service interruption, it is preferable to ensure that the synchronization is established before cutting the communication of the user terminals with the first satellite and that the user terminals are capable of communicating simultaneously with the two satellites during synchronization, and this may be achieved with the embodiment represented in FIG. 14a.

Figure 17:
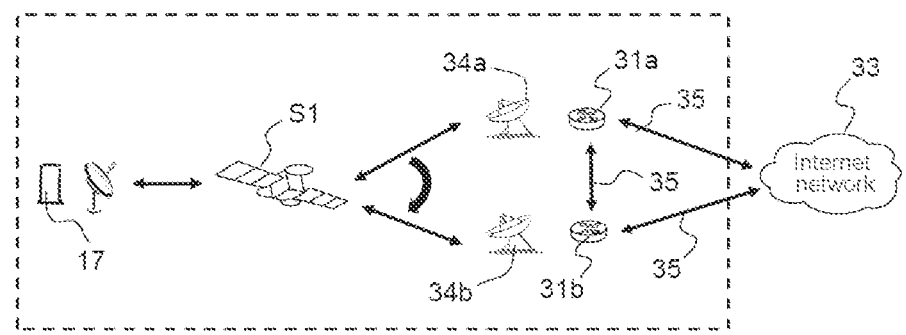
FIG. 17: a diagram of an exemplary handover of the radiofrequency links between two anchor stations, according to the invention.

FIG. 17 represents a handover of the communications between two anchor stations. This type of handover is necessary when an anchor station 34a which serves a user terminal 17 by way of a satellite S1 exits the visibility area of this satellite S1, but the user terminal 17 is still in the visibility area of this satellite, as shown in particular by the example of FIG. 7. The anchor stations 34a, 34b all being connected together by way of the worldwide Internet network 33, they communicate with one another by way of the Internet network. According to the handover program established by the operations planning centre 32, the second anchor station 34b which comprises an available directional antenna points this available antenna towards the same satellite S1 as the first anchor station 34a and simultaneously synchronizes its internal clock and its carrier frequencies with those of the first anchor station. Next, the first anchor station 34a transmits to the second anchor station 34b the list of user cells to be served and the radiofrequency resources which they require. The first anchor station 34a furthermore requests the router 31a with which it is directly linked to re-route the traffic of the user cells towards the second anchor station 34b by way of the router 31b to which it is linked. Thereafter the second anchor station 34b can begin to communicate with the terminals of the user cells by way of the satellite by using the same carrier frequencies as those used by the first anchor station.

Figure 18:
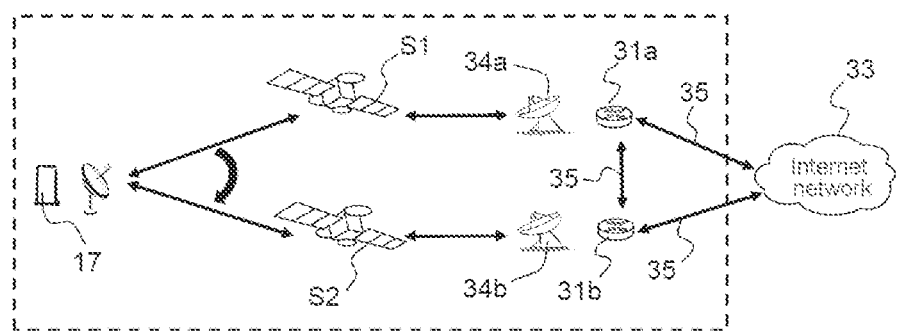
FIG. 18: a diagram of an example of dual-handover of the radiofrequency links simultaneously between two satellites and two anchor stations, according to the invention.

In the case where it necessary to carry out a dual-handover of the communications between two satellites S1, S2 and between two anchor stations 34a, 34b, as represented in the example of FIG. 18, the first anchor station 34a which serves the user cells 17 by way of the first satellite S1 must be replaced with the second anchor station 34b and the first satellite S1 must be replaced with the second satellite S2. The anchor stations all being connected together by way of the Internet network 33, they communicate with one another by way of the Internet network. According to the handover program established by the operations planning centre 32, the second anchor station 34b which comprises an available directional antenna points this available antenna towards the second satellite S2 and simultaneously synchronizes its internal clock and its carrier frequencies with those of the first anchor station 34a. Next, the first anchor station transmits to the second anchor station the list of user cells to be served and the radiofrequency resources which they require. The first anchor station furthermore requests the router 31a to which it is linked to re-route the traffic of the user cells towards the second anchor station by way of the router 31b and requests the user terminals 17 to point their second antenna towards the second satellite S2. While the user terminals point their second antenna for example on the basis of the ephemerides of the second satellite or on the basis of the tracking of a beacon signal of the second satellite, the first anchor station begins to dispatch to the second anchor station the plan of the allocations of the resources to be allotted to the user cells. Thereafter the second anchor station can begin to communicate with the user cells by way of the second satellite by using the same carrier frequencies as those used by the first anchor station with the first satellite and the user terminals can begin to acquire the signals transmitted by the second anchor station by way of the second satellite. In accordance with the handovers program planned by the operations planning centre 32, the second satellite S2 can then begin to relay the radiofrequency signals between the second anchor station 34b and the user cells 17, and after a step of synchronization on the basis of a specific signal dispatched by the user terminals as described hereinabove in conjunction with FIG. 16, the first satellite can stop relaying the radiofrequency signals between the user cells and the first anchor station. The first anchor station can then stop transmitting and receiving radiofrequency signals by way of the first satellite.

Although the invention has been described in conjunction with particular embodiments, it is very obvious that it is in no way limited thereto and that it comprises all the technical equivalents of the means described as well as their combinations if the latter enter within the framework of the invention.

The invention claimed is:

1. A satellite communication system for providing a continuous high-bitrate access service over a terrestrial coverage area including at least one polar region, comprising a constellation of satellites placed in elliptical orbit around the Earth with an apogee at an altitude of less than or equal to 20000 km, user terminals located in the coverage area, and at least two anchor stations distributed on the Earth and able to ensure bidirectional communications with the user terminals by way of at least one orbiting satellite progressing above the coverage area, wherein said satellite communication system further comprises a network of routers interconnected with one another and to the Worldwide Internet Network by dedicated local terrestrial communication pathways, wherein each anchor station is connected to the Worldwide Internet Network by way of routers, and wherein each anchor station comprises a management device configured to control handovers of the communications between the orbiting satellites progressing successively above the coverage area and between the anchor stations, and simultaneous dual-handovers of the communications between multiple satellites and anchor stations.

2. The satellite communication system according to claim 1, wherein each anchor station, each router, each satellite and each user terminal comprises a respective navigation receiver configured to synchronize amongst themselves and to synchronize all the handovers of the communications between the satellites and the anchor stations.

3. The satellite communication system according to claim 1, wherein, at each instant, the user terminals and the anchor stations are configured to ensure the communications heading for the user terminals are situated in areas of visibility of at least one satellite and wherein areas of visibility of two consecutive satellites comprise an overlap area called a handover area, the handovers of the communications destined for a user terminal being carried out when the user terminal is situated in the handover area.

4. The satellite communication system according to claim 3, further comprising an operations planning centre connected to the anchor stations by way of the network of routers, the operations planning centre configured to regularly receive ephemerides of each satellite of the constellation and to form a general plan of all the handovers of the communications to be carried out successively over time between the satellites and between the anchor stations.

5. The satellite communication system according to claim 4, wherein each anchor station comprises at least two steerable directional antennas respectively associated with two chains for emitting and receiving frequency-multiplexed signals, configured to be pointed respectively towards two consecutive satellites of the constellation and to serve one or more user cells simultaneously by way of one or of two consecutive satellites of the constellation.

6. The satellite communication system according to claim 5, wherein each user terminal comprises at least one directional antenna associated with at least one chain configured to emit and receive a radiofrequency signal over bidirectional radiofrequency linkups established by one or two anchor stations with one or two satellites of the constellation.

7. The satellite communication system according to claim 6, wherein each satellite of the constellation comprises two steerable directional antennas associated with the at least one chain configured to emit and receive radiofrequency signals for relaying radiofrequency links established by two different anchor stations towards user cells and switching means configured to activate or interrupt one or more radiofrequency links established by one or the other of the two anchor stations with the user cells.

8. The satellite communication system according to claim 7, further comprising at least two anchor stations situated inside or outside the coverage area.

9. The satellite communication system according to claim 1, further comprising two coverage areas covering two polar regions, arctic and antarctic, a constellation of satellites placed in elliptical orbit around the Earth, in a single orbital plane inclined by an angle of between 60° and 90° with respect to a terrestrial equatorial plane, the satellites being distributed around the Earth at an altitude of less than or equal to 20000 km, user terminals located within the two coverage areas comprising the two polar regions at latitudes of respectively greater than +60° and less than −60°, and at least one anchor station per polar regions.

10. The satellite communication system according to claim 1, further comprising a coverage area including at least one of two polar regions, arctic and antarctic, a constellation of satellites placed in elliptical orbit around the Earth, in several orbital planes equi-distant from one another and inclined by an angle of between 60° and 90° with respect to a terrestrial equatorial plane, the satellites being distributed around the Earth at an altitude of less than or equal to 20000 km, user terminals located in the coverage area, and a set of anchor stations distributed within or beyond the polar regions.

11. The satellite communication system according to claim 1, wherein the constellation is placed on circular orbit plane(s) to provide service over a coverage area including one of two polar regions, arctic and antarctic and the handovers of the communications are carried out successively over time between the satellites and between the anchor stations, the satellites being equi-distributed around the Earth at an altitude of less than or equal to 20000 km.

* * * * *